Patented Apr. 7, 1942

2,278,483

UNITED STATES PATENT OFFICE 2,278,483

METHOD OF TREATING CACAO BEANS

William J. Plews, Chicago, Ill., assignor to Food Manufacturing Corporation, a corporation of New York No Drawing. Application February 20, 1939, Serial No. 257,465. In Canada May 23, 1938

9 Claims. (Cl. 99—23)

This invention relates to a method of treating cacao beans of commerce, i. e. beans which have received only the usual treatments at the source of supply to enable them to be shipped.

In preparing cacao products from such beans, the present practice is first to remove from the beans any stones and other hard heavy foreign matter, then grade them as to size and then roast them for periods varying, according to their character and the practice of the individual manufacturing establishments, from about one-half hour to an hour. The roasting is generally effected at temperatures of from about 100° to 135° C. in externally heated revolving drums, though recently equipment has been developed for effecting the roasting by means of circulating hot air. As a result of the roasting the shells of the beans are loosened so that they may be broken off with the fingers, and a certain amount of the flavor of the beans is developed. After the beans have been roasted they are cooled, cracked into relatively small pieces and then run through a winnowing machine to separate the bits of shell from the bits of kernel, which in this state are known as nibs.

The roasting has several disadvantages. The time required is long, the starch cells of the beans are gelatinized and hardened to an indigestible state, the germs are left so hard and brittle that their separation from the nibs is considered necessary by some manufacturers to prevent them from lowering the quality of the final product, and a certain amount of the fat content of the kernels is lost to the shells by absorption. The separation of the germs is expensive as it involves the loss not only of the germs themselves but also of any nibs which are of the same size and shape as the germs, the two together amounting to about 4% of the total weight of the kernels. The loss of fat to the shells, which is from 1% to 3%, is important, since though cocoa butter is valuable, its recovery from the shells is so expensive as to be hardly worth while. Apart from these disadvantages, the loosening of the shells by the roasting is not complete, so that large bits of kernel with small adhering bits of shell go with the nibs and small bits of kernel with large adhering bits of shell go with the shells in the winnowing operation. The nibs generally contain about 2% of shell and there is about a 2% loss of nibs with the shells.

According to the present invention the main purpose of roasting, namely, loosening of the shells, is accomplished effectively and in an extremely short time, and the above mentioned disadvantages of roasting may be avoided by a method which consists essentially in subjecting the cacao beans of commerce to the action of steam for a time at least long enough to cause their shells to become loose. The treatment may be effected at atmospheric or at superatmospheric pressure, though preferably the latter. Even when carried out at atmospheric pressure it immensely reduces the time required to loosen the shells, leaves the kernels no harder and generally slightly softer than before treatment, dextrinizes the starch content of the kernels to some extent, very substantially reduces the absorption of fat from the kernels by the shells, eliminates the necessity of a preliminary grading of the beans for size, as the steam surrounding all the beans acts on both small and large uniformly, and permits a more exact control of temperatures than is possible at present, since the beans, instead of being heated principally by contact with the heated surface of a roasting drum, are heated by a fluid which entirely surrounds them and which can itself be heated to a definite temperature. Moreover, with a slightly longer time than that required for mere loosening of the shells it is capable of developing the flavor of the beans as effectively as roasting. Such flavor development may, however, seldom be necessary, as I have discovered that the development of flavor which results from the subsequent processing of the nibs is in very many cases entirely adequate.

If the treatment is carried out at superatmospheric pressure it preferably ends with a sudden reduction in such pressure to that of the atmosphere. This sudden reduction in pressure results in an explosive action on the beans, since during the treatment the steam penetrates them making their internal pressure about equal to the prevailing high external pressure, and then forces its way out through the restricted pores when the external pressure is suddenly reduced, thus disrupting the structure of the beans to an extent depending upon the amount of the external pressure at the time of pressure reduction. Even if the pressure is comparatively low, the sudden reduction materially aids in loosening the shells and so permits not only a shortening of the time, but also a better separation of nib and shell. If the pressure is high the sudden reduction explodes the starch cells in the kernels, leaving the latter very readily friable and easily digestible, and renders the germs so friable that they may be ground and further processed as easily as the nibs.

The treatment according to the invention may be carried out in various ways. The steam may be supplied from an external source, or by externally heating a chamber containing the beans, generally with some added moisture, as that of the beans themselves is usually too low to result in sufficient steam generation, or partly in one way and partly in the other. The first of these ways, however, will generally be found the preferable as it eliminates the possibility of scorching some beans by contact with a very hot chamber wall, and permits more accurate control of the treating temperature.

It is desirable that the moisture content of the threaded beans should be as low as possible, since if it is too high a special drying operation will be necessary before the beans can be further processed. For this reason, it is preferable that any steam supplied from an external source should be substantially superheated.

From what has preceded it will be seen that according to my preferred method, the beans are treated at substantial superatmospheric pressure with steam supplied from an external source and carrying a substantial amount of superheat, for a time at least sufficient to cause their shells to become loose, although it may be longer, and that at the end of this time the pressure is suddenly reduced to that of the atmosphere.

In order to describe the present invention more clearly, a preferred embodiment thereof will now be disclosed. It should be understood, however, that this is done solely by way of example, and is not to be construed as a limitation upon the spirit and scope of the appended claims.

It is almost impossible to set definite limits of temperature, pressure and time within which it can be said that the method will give satisfactory results and outside which it will fail. There appears to be no point in a scale of gradually changing temperatures, pressures and times at which there is an abrupt change in the character of the treated beans. Moreover, the most suitable conditions of pressure, temperature and time depend largely upon the state and nature of the beans being treated and upon the characteristics desired of the treated kernels, and may depend somewhat on the apparatus used to carry out the method. However, with a knowledge of the pressures, superheats and times which have been used with success and a knowledge of the apparatus in connection with which they were used, it will be possible for those skilled in the art to determine the correct conditions of treatment in different circumstances.

In the experimental practice of the invention the apparatus used was that shown in my Canadian Patent No. 369,155, dated October 5, 1937, and had a chamber 18" long and 4" in diameter with a capacity of 4 lbs. of beans. The main steam pipe was ½" in diameter and the pipe from the trunnion to the base of the chamber was ¼" in diameter. With this apparatus line pressures between 100 and 200 lbs. per square inch, superheats between 25° and 300° F. and times between 5 and 120 seconds were tried.

It has been found desirable to use as high a line pressure as is practicable having regard to economic and other considerations, since the higher the pressure the shorter can be the time to obtain a given result. Moreover, it is only with pressures of about 100 lbs. or over prevailing in the chamber at the moment of pressure release that any appreciable increase in the friability of the kernel and germ can be obtained, and the increase is more marked the higher the pressure. It should be noted that, if the time of treatment is short, the pressure prevailing in the chamber at the moment of release will depend upon the time. The prevailing pressure rises quickly at first and then more slowly until line pressure is attained. Thus, it was noted that with a line pressure of 200 lbs. and superheat of 150° F., the prevailing pressure after 5 seconds was 60 lbs., after 10 seconds 120 lbs., after 15 seconds 140 lbs., and after 20 seconds 165 lbs., line pressure being reached at about 35 seconds. If loosening of shells alone is desired, good results can be obtained with prevailing pressures at the moment of release of about 50 lbs. There are of course certain varieties of beans e. g. Accra, whose shells are normally fairly loose and which would therefore require lower pressures to produce complete loosening than other varieties with very tight shells e. g. Grenada. However, as it is usual to make the required mixture of beans before any treatment, advantage can seldom be taken of this fact. As the pressures increase, more and more of the shells will be blown off the beans and at about 150 lbs. they will practically all be so. However, there is not much advantage in this as the beans must in any case be broken up and winnowed and the winnowing is just as effective and easy if the shells have been simply loosened in the treatment according to the invention as if they have been blown off. As indicated above, the prevailing pressure must be substantially above 50 lbs. to produce readily friable kernels and germs, pressures of between about 150 and 200 lbs. having been found suitable for this purpose. When the treatment is intended to render the beans more friable, it will be found that beans which are dense or are dry and therefore hard require higher pressures for a given result than those which are less dense or have a higher moisture content and are therefore softer.

Superheat is the factor which principally controls the moisture content of the treated beans. It also has some effect on the degree to which the beans are cooked but not as great an effect in this respect as the time. It is the factor which can be varied within the widest limits without substantially altering the character of the treated beans. The range of superheats between about 100° and 200° F. is that in which beans of the most varied character may be treated with success. Good results may be obtained with superheats of less than 100° F. but there is always the danger of excessive condensation if the beans have too high a moisture content for the superheat chosen. In the same way good results may be obtained with superheats of over 200° F. but here there is the danger of scorching if the moisture content of the beans treated is too low. It is possible to obtain a low moisture content in the treated beans even when using a low superheat by bleeding off some or all of the steam in the chamber after a certain time of treatment and then supplying more steam which, as it strikes hot beans condenses comparatively little but supplies the requisite pressure which is to be suddenly released. This method of procedure, however, increases the time of treatment and involves extra manipulation of the apparatus.

Time of treatment is the factor which principally controls the extent to which the beans are cooked and to which their flavor is developed. Moreover, as indicated above, the time in some cases also affects the prevailing pressure in the chamber. In fact, with apparatus of the kind referred to, it will generally be found easier to use a constant high line pressure of, say, 200 lbs. and to adjust the pressure prevailing in the chamber at the moment of release by adjusting the time than to vary the line pressure as required. With a line pressure of about 200 lbs. and the preferred range of superheat, a range of time between about 5 seconds and 50 seconds has been found sufficient to give the full desired range of characteristics in the treated beans.

From what has been said about the three factors individually it will be clear that they are to a considerable extent interrelated, so that if one is altered in one sense, it may be possible to alter one or both of the others in the opposite sense without very noticeably changing the characteristics of the treated beans.

In practicing the invention with the apparatus referred to, I have successfully produced treated beans whose shells are completely loose but which otherwise differ little from the raw beans by using a line pressure of about 200 lbs., superheat of about 150° F. and a time of from 5 to 10 seconds. The steam appears to break down the bond between the shell and kernel and, upon the sudden release of pressure, to force the shell away from the kernel. In the shorter times of treatment mentioned the steam has little effect on the kernel or germ, but whatever effect it has is beneficial as there is a slight softening of both kernel and germ and a slight dextrinization, hydrolization and disruption of the starch cells, as opposed to the hardening of kernel and germ and gelatinization of the starch content which results from roasting. With beans which have received even this slight treatment according to the invention, separation of nib and shell is better than with roasted beans, grinding costs should be slightly lower and the final products rather more easily digestible. Moreover, the fat content of the kernels is higher than that of ordinary roasted beans, as there is less absorption of fat by the shells, presumably because the steam initially permeates the shells and condenses on them to render them substantially fat repellant.

If with the line pressure and superheat mentioned in the last paragraph the time is increased to about 35 to 40 seconds, the shells are substantially entirely blown off and the character of the kernels and germs very greatly changed. The beans are cooked and their flavor developed to about the same extent as in the present roasting. At the same time their starch cells are dextrinized and hydrolized to a considerable extent and are also exploded, so that the texture of the treated beans is quite different from that of untreated or roasted beans. Instead of being hard and relatively dense, the kernels are comparatively soft and so friable that they may even be crushed between the fingers. As a result of these features cocoa made from them is considerably more soluble and suspensible than that made from roasted kernels, this being of particular importance in the manufacture of superfine cocoa for the dairy trade to be used in the preparation of such products as chocolate milk. Products made from the beans treated in accordance with the invention are more digestible than those made from roasted beans, owing to the changes in the starch content resulting from the treatment of the invention. The germs in the treated beans are no longer very hard and dense as they are in the untreated beans and to an even greater extent in roasted beans, but are highly expanded and considerably more friable than the kernels. Consequently there can be no objection to their inclusion with the nibs. However, they may, if desired, be separated from the nibs and will then provide a source of highly soluble low fat content cocoa powder high in theobromine.

This soluble low fat content cocoa powder may also be prepared from germs separated from beans, for instance ordinary roasted beans, which have not themselves been treated according to the invention. In this case the separated germs are treated in the preferred manner previously described with a prevailing pressure at the moment of release of over 100 pounds per square inch.

In the foregoing detailed description it will be apparent that many variations may be made by those skilled in the art without departing from the spirit and scope of the invention. I therefore intend to be limited only in accordance with the following claims.

I claim:

1. The method of treating cacao beans of commerce which comprises subjecting said beans directly to the action of superheated steam at superatmospheric pressures for a time at least sufficient to loosen the shells, and thereafter suddenly reducing the pressure.

2. The method as defined in claim 1, in which the time of treatment is substantially no longer than enough to cause the shells of the beans to become loose.

3. The method of producing a low fat content cocoa powder which comprises subjecting cacao bean germs directly to substantial superatmospheric temperature and to external fluid pressure of over about 100 lbs. per square inch by means of steam and then suddenly releasing such pressure.

4. The method of treating cacao beans of commerce, which comprises subjecting said beans directly to gas pressure substantially in excess of fifty pounds per square inch by means of steam superheated from approximately 100° to approximately 200° F. for a period from approximately 5 seconds to approximately 50 seconds, and then suddenly releasing such pressure.

5. The method of producing a low fat content cacao bean product which comprises subjecting cacao beans directly to substantially superatmospheric temperature and to external fluid pressure of over about 100 pounds per square inch by means of steam and then suddenly releasing such pressure.

6. The method of treating cacao beans of commerce in lieu of the usual roasting, which comprises subjecting the beans directly to the action of steam at superatmospheric pressure and suddenly reducing the pressure at the end of the steam treatment.

7. The method of treating cacao beans of commerce in lieu of the usual roasting, which comprises subjecting the beans directly to the action of steam at superatmospheric pressure for a time at least sufficient to cause their shells to become loose, and suddenly reducing the pressure at the end of the steam treatment.

8. A friable, explosion-expanded cacao bean containing dextrinized starch cells, obtained by subjecting cacao beans of commerce directly to the action of superheated steam at superatmospheric pressure for a time at least sufficient to loosen the shells, and thereafter suddenly reducing the pressure.

9. Cocoa powder obtained by crushing cacao beans of commerce which have been subjected directly, for a period of approximately five seconds to approximately fifty seconds, to gas pressure substantially in excess of 50 pounds per square inch, by means of steam superheated from approximately 100° F. to approximately 200° F., and then suddenly released from such pressure.

WILLIAM J. PLEWS.